Jan. 24, 1967 H. VISSERS 3,300,223
APPARATUS FOR SPREADING OR SOWING GRANULAR MATERIALS
Filed Aug. 3, 1964
2 Sheets-Sheet 1
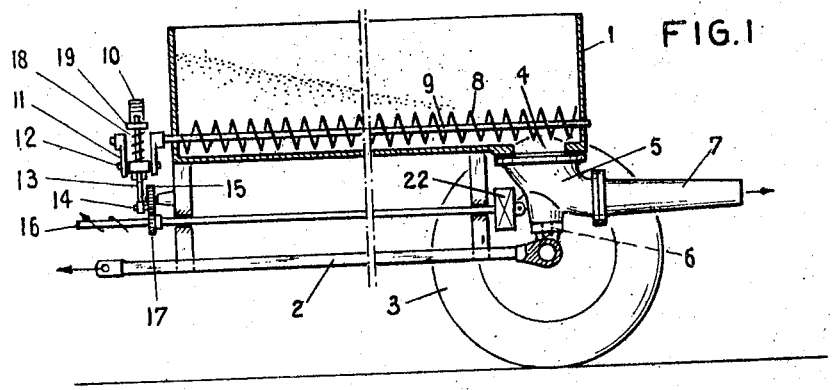
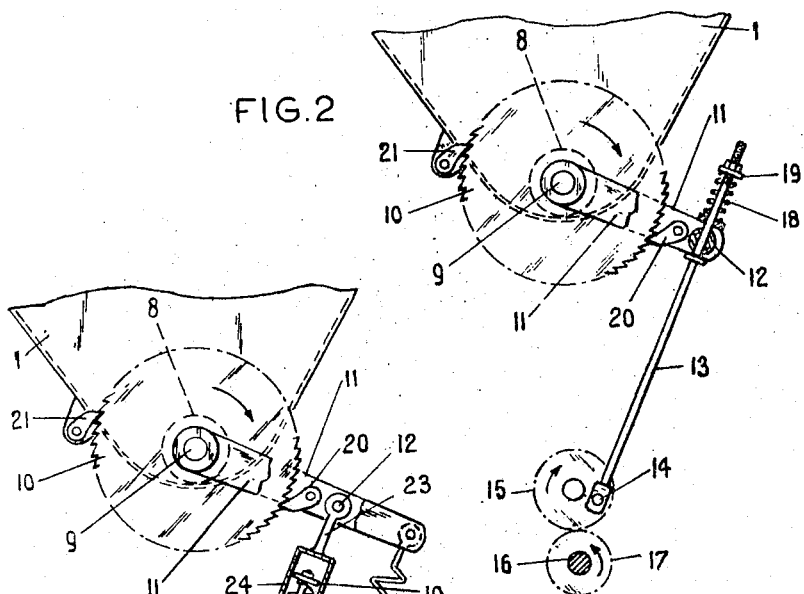
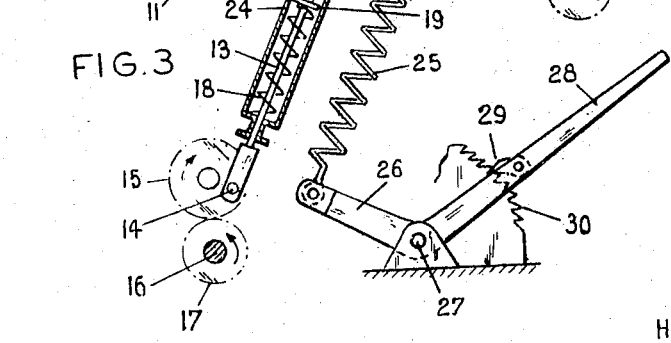
INVENTOR
HERBERT VISSERS
BY *Mirie and Smiley*
ATTORNEYS Jan. 24, 1967   H. VISSERS   3,300,223
APPARATUS FOR SPREADING OR SOWING GRANULAR MATERIALS
Filed Aug. 3, 1964   2 Sheets-Sheet 2
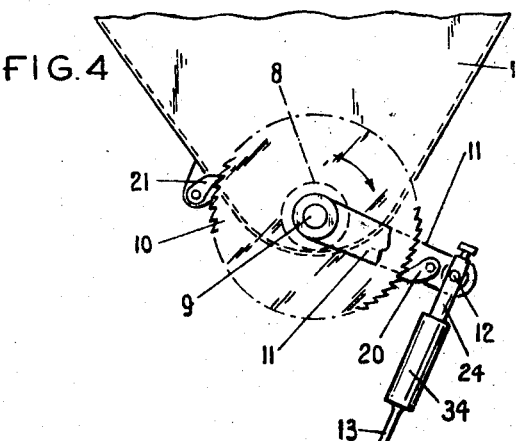
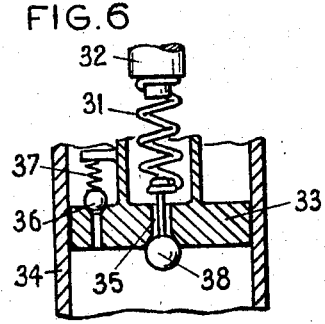
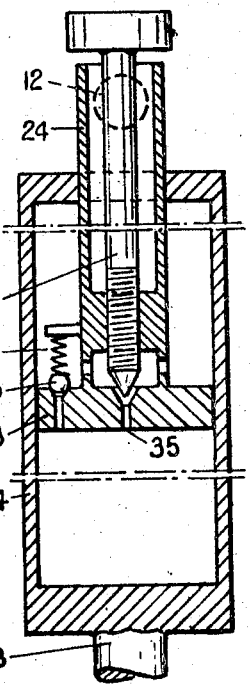
INVENTOR
HERBERT VISSERS
BY *Mirick & Smiley*
ATTORNEYS.

3,300,223
APPARATUS FOR SPREADING OR SOWING GRANULAR MATERIALS
Herbert Vissers, Nieuw Vennep, Netherlands, assignor to Landbouwwerktuigen- en Machinefabriek H. Vissers N.V., Nieuw Vennep, Netherlands, a company of the Netherlands
Filed Aug. 3, 1964, Ser. No. 387,050
Claims priority, application Netherlands, Oct. 18, 1963, 299,423/63
2 Claims. (Cl. 275—8)

The invention relates to an apparatus for spreading or sowing granular materials, which is provided with a trough-shaped storage hopper supported by a travelling frame and having a discharge opening at its bottom and a spreading member movable below said opening.

When the hopper has in relation to its width a greater length, the drawback occurs that the hopper is not emptied, so that a rather large quantity of material remains therein. If a conveying screw is provided in the hopper, at the bottom thereof for moving the material towards the discharge opening, the material in the hopper when completely filled will exert such a heavy pressure that the conveying screw encounters a large resistance at the material and the grains of the material due to the friction at the screw at least partially are pulverized.

Object of the invention is to remove said drawback and according to the invention one or more spring members are provided in the connection of the conveying screw horizontally extending at or near the bottom of the hopper with its driving member, said spring members being adapted to take up the movement of the driving member dependent on the required driving force for the conveying screw. As with a completely filled hopper the required driving force will be large, the spring member in this arrangement will be compressed and the conveying screw will remain stationary. According to the amount the hopper is emptied, the movement of the driving member is for a part will not be taken up in the spring member dependent on the pre-tension of the spring, so that the useful movement of the driving member will be increased. The resistance encountered by the conveying screw at the granular material is then smaller accordingly, so that not only pulverizing of the material is prevented but also the power consumption of the conveying screw will be smaller.

The invention will be further described with reference to the accompanying drawings illustrating several embodiments of an apparatus according to the invention.

In the drawings FIG. 1 is a longitudinal sectional elevation of the storage hopper and FIG. 2 is an end view on enlarged scale of the lower part of the hopper at the driven side of the conveying screw.

FIG. 3 is a view similar to FIG. 2 of a modified construction in which the spring member comprises two springs.

FIG. 4 is a similar view of an embodiment having the spring member replaced by a piston and a cylinder filled with a liquid and/or a gas.

FIG. 5 is a longitudinal sectional view of the cylinder shown in FIG. 4 on a still larger scale and FIG. 6 is a sectional view of a piston of modified construction.

As appears from FIG. 1 the hopper 1 is carried by a frame 2 provided with a pair of ground wheels 3. Below the outlet 4 of the hopper a bowl 5 is supported on the frame 2 by means of a journal 6 for swinging movement and a spout 7 extends at the bowl 5. Near the bottom of the hopper 1 a conveying screw 8 is rotatably mounted and has a ratchet wheel 10 secured to its shaft 9 at the end projecting out of the hopper thereof. An arm 11 (FIG. 2) is rotatable on the shaft 9 and at its other end is provided with a rotatable journal 12 and carrying a pawl 20 meshing with the teeth of wheel 10. A rod 13 is slidable in a transverse bore of journal 12 and engages a crank pin 14 on a toothed wheel 15 receiving its rotation from a wheel 17 secured on a shaft 16.

With the embodiment shown in FIGS. 1 and 2 a helical spring 18 is placed on the free end of the rod 13 and said spring with its one end is supported on arm 11 and with its other end on a disc 19 which is adjustably mounted on rod 13. When during rotation of the toothed wheel 15 the hopper 1 is already partly emptied the conveying screw 8 will encounter less resistance at the granular material in the hopper and the spring 18 will be less compressed dependent on the pretension thereof, so that the arm 11 will be rotated and rotates the ratchet wheel 10 correspondingly through one or more teeth. For preventing the ratchet wheel 10 from rotating backwards a counter pawl 21 is provided.

With the embodiment of the driving mechanism of the conveying screw according to FIG. 3 a rod 23 engages the arm 11 at 12, said rod being formed to a cylinder 24 in which the rod 13 slidably extends and engages the crank pin 14 on toothed wheel 15. With said embodiment a second spring 25 engages the end of the arm 11 and with its other end is secured to the arm 26 of a lever having a fixed pivot 27. The other arm 28 of said lever carries a pawl 29 by means of which the lever can be held in the toothing of a segment 30. As soon as during rotation of wheel 15 the pin 14 reaches its bottom dead center position the spring 18 upon further rotation of wheel 15 will expand and then change of load on the inner meshing teeth of wheels 15, 17 is caused only by said weaker spring 18. The pretension of the stronger spring 25 may be varied by adjusting lever 26, 28.

It is to be noted that in the arrangement shown in FIG. 3 the spring 25 needs not to engage an adjustable lever for varying the tension of the spring as the spring may be secured to an adjustable threaded rod. It would also be possible to mount the spring for easy removal in order to be replaced by a stronger or a weaker spring.

With the embodiment shown in FIGS. 4 and 5 a piston 33 having a hollow rod 24 engages the arm 11 by means of journals 12 each extending in a bore of the cheeks of arm 11. The piston 33 is slidable in a cylinder secured to rod 13 engaging the crank pin 14 of the toothed wheel 15. The cylinder 34 is filled with liquid which through a bore 35 provided in the piston may flow from the one side of the piston to the other side thereof. When during rotation of wheel 15 the hopper 1 is already partly emptied the conveying screw 8 will encounter less resistance at the material and derendent on the passage area of the bore 35 less liquid will escape from the space above the piston 33 so that the piston moves downwards and the ratchet wheel 10 will correspondingly be rotated through one or more teeth. As soon as during rotation of the wheel 15 the crank pin 14 reaches its lowermost position the cylinder 34 upon further rotation of the wheel will move upwards, so that the liquid through bore 35 escapes from the space below the piston. The liquid may also escape upwards by a valve 36 loaded by a spring 37.

The passage area of bore 35 may be adjusted by means of a needle 39. With the modification shown in FIG. 6 said needle has been replaced by a ball valve 38 connected by a draw-spring 31 to a vertically adjustable rod 32.

The shaft 16 of wheel 17 may be driven by the take-off shaft of a tractor to which the frame 2 of the apparatus is coupled. The shaft 16 may also be used for driving the bowl 5 with the spout 7 through the intermediary of a suitable gear 22 (FIG. 1).

What I claim is:

1. An apparatus for spreading or sowing granular material, comprising a trough-shaped storage hopper supported by a travelling frame, said hopper having an outlet in the bottom thereof, a spreading member movable under said outlet, a shaft with a conveying screw for feeding material to the hopper outlet, and means for driving said shaft and including a toothed ratchet wheel secured to said conveying screw shaft, an arm having one end rotatable on said shaft, a pawl pivoted on said arm in driving engagement with the teeth of the ratchet wheel, driving means including a crank pin pivotally connected to a driving rod, means pivotally connecting said rod to said arm including means slideably guiding the rod transversely of the arm, a first spring supported by a collar on said rod and urging said arm and pawl in the driving direction of the ratchet wheel, a second spring also urging the arm in said driving direction, means pivotally connecting the second spring at one end directly to said arm and at the other end to said frame, both said springs being adapted to take up the movement of the crank pin dependent upon the resistance of the conveying screw, and a second pawl pivotally mounted in fixed position and engaging said ratchet wheel to prevent reverse rotation thereof.

2. An improved ratchet drive mechanism according to claim 1 wherein said first spring is smaller and weaker than said second spring.

References Cited by the Examiner

UNITED STATES PATENTS

| | | | |
|---|---|---|---|
| 972,761 | 10/1910 | Gauntt | 74—116 X |
| 1,150,235 | 8/1915 | Ward | 74—116 |
| 1,788,729 | 2/1928 | Meier | 74—116 X |
| 2,023,579 | 12/1935 | Dodge | 74—600 X |
| 2,407,104 | 9/1946 | Schmied | 275—5 X |
| 2,614,849 | 10/1952 | Holben | 275—8 |
| 3,127,778 | 4/1964 | Koch | 74—116 |

ABRAHAM G. STONE, *Primary Examiner.*

J. R. OAKS, *Assistant Examiner.*